United States Patent
Scarpa

(10) Patent No.: US 6,668,027 B1
(45) Date of Patent: Dec. 23, 2003

(54) SELF ADJUSTING AUTOMATIC GAIN CONTROL (AGC) POWER REFERENCE LEVEL CIRCUIT

(75) Inventor: Carl Scarpa, Plainsboro, NJ (US)

(73) Assignee: Hitachi America, Ltd., Tarrytown, NY (US)

( * ) Notice: Subject to any disclaimer, the term of this patent is extended or adjusted under 35 U.S.C. 154(b) by 0 days.

(21) Appl. No.: 09/490,612

(22) Filed: Jan. 25, 2000

Related U.S. Application Data

(60) Provisional application No. 60/122,538, filed on Mar. 2, 1999.

(51) Int. Cl.[7] ............................................. H04L 27/08
(52) U.S. Cl. ..................................................... 375/345
(58) Field of Search ................................ 375/345, 344, 375/316; 455/240.1, 245.1, 250.1

(56) References Cited

U.S. PATENT DOCUMENTS

| | | | | |
|---|---|---|---|---|
| 5,301,364 A | * | 4/1994 | Arens et al. ................. | 375/345 |
| 5,563,916 A | | 10/1996 | Scarpa ......................... | 375/345 |
| 5,659,582 A | * | 8/1997 | Kojima et al. .............. | 375/345 |
| 6,038,435 A | * | 3/2000 | Zhang .......................... | 375/345 |

\* cited by examiner

*Primary Examiner*—Mohammad H. Ghayour
*Assistant Examiner*—Demetria Williams
(74) *Attorney, Agent, or Firm*—Straub & Pokotylo; Michael P. Straub

(57) ABSTRACT

Methods and apparatus for performing gain control in a manner that is designed to maximize the use of the dynamic range of signal processing circuitry, e.g., an A/D converter, while minimizing signal clipping are described. In one embodiment a power reference level used for automatic gain control purposes is periodically adjusted. An exemplary state machine of the present invention has an analysis state which collects signal statistics, e.g., signal clipping and threshold statistics, for a period of time corresponding to a fixed number of samples. During the analysis state, the number of samples that equal or exceed either the minimum or maximum valid values (e.g., clip points), supported by the signal processing circuitry, are accumulated. Statistics are also accumulated on the number of data samples that exceed thresholds, e.g., +/−tail thresholds, corresponding to points near the outer portion of the range supported by the signal processing circuitry. At the end of each analysis period, a decision is made to decrease the AGC power reference level if points were clipped, or increase the AGC power reference level if no points exceeded the tail thresholds. If neither the condition to raise nor the condition to lower the AGC power reference level is satisfied, no change is made to the power reference level. The state machine of the present invention can be used as an AGC circuit to directly control the adjustment of the gain of a signal.

26 Claims, 7 Drawing Sheets

US 6,668,027 B1

SELF ADJUSTING AUTOMATIC GAIN CONTROL (AGC) POWER REFERENCE LEVEL CIRCUIT

RELATED APPLICATIONS

This application claims the benefit of U.S. Provisional Application Ser. No. 60/122,538 filed Mar. 2, 1999.

FIELD OF THE INVENTION

The present invention relates to automatic gain control and, more particularly, to methods and apparatus for generating automatic gain control signals and/or for adjusting a signal power reference level used by an automatic gain control (AGC) circuit.

BACKGROUND

Information is frequently communicated using digital signals. For typical digital communication signals a histogram of a sampled radio frequency (RF) signal may appear something similar to that of the Gaussian traditional bell shaped curve. Graph 100 of FIG. 1 is a histogram of a signal that is perfectly represented by a digital sampling system whose scaling ranges from a maximum negative (−) scale to a maximum positive (+) scale. This signal would have a standard deviation approximately equal to max_scale/3. In FIG. 1, the vertical axes corresponds to the occurrence rate of samples while the horizontal axis represents the digitized values of the samples which represent the signal. A signal's power is equal to its standard deviation squared. Hence, by controlling a signal's amplitude such that is equals a target standard deviation, one can approximately set the signal's power level to the standard deviation squared.

In various signal processing operations, such as analog to digital (A/D) conversion, it is desirable to use the full useful dynamic range of the signal processing circuitry, e.g., A/D converter. However, allowing a signal to exceed the signal processing circuit's useful dynamic range, can lead to undesirable consequences such as signal clipping or the introduction of other signal distortions. Accordingly, it is often desirable to control the power level of a signal being processed.

AGC circuits are used to control the power of a signal being processed. Frequently this is done by supplying a gain control signal, generated by an AGC circuit, to a tuner or other device which controls the gain of a signal. Many forms of automatic gain control circuits employ a power reference level to which an estimate of the signal's power is compared. The AGC signal is then adjusted so that the signal's power will approximate the power reference level. In most known systems, the power reference level is fixed, e.g., set to a fixed value at the time the system is manufactured.

Graph 102 of FIG. 1 illustrates what happens if the power reference level is set too high. Examining graph 102 reveals that a large amount of signal clipping will occur at the signal edges 103, non-linearly distorting the received signal. Graph 104 is a histogram of the same signal, illustrated in graphs 100 and 102, when controlled using an AGC with a power reference level that is set too low, e.g., small. Notice in this scenario, the full dynamic range 105 is not utilized. Although this problem is less severe than the signal clipping problem, it is does not allow an optimum usage of the available signal processing circuitry's dynamic range.

FIG. 2 illustrates a receiver 200 which incorporates a known AGC circuit 208. As illustrated the receiver 200 comprises an antenna 202, tuner 204, analog to digital (A/D) converter 206, and an AGC circuit 208 which is coupled to additional signal processing circuitry, e.g., demodulator circuitry 210.

The known AGC circuit 208 estimates the current signal power level, e.g., by performing a simple squaring operation followed by a low pass filtering operation. If the current signal power estimate is below the fixed power reference level (PRL) 209, then the AGC signal, supplied to the tuner via line 212, is adjusted to cause the tuner 204 to apply more gain to the received signal. Conversely, if the AGC circuit's current estimate of the signal power is too large, e.g., if it exceeds the fixed PRL, the AGC signal is modified so that the gain applied to the signal being processed is decreased.

It is well known that a communications channel can effectively change the peak to average power ratio of a received signal. This unfortunate result can be caused by linear distortions such as, e.g., multipath and/or large amounts of additive noise, and non-linear distortions such as those associated with receiver front end overloading. Under such noisy conditions, when a fixed power reference level is used, it is possible that signal processing circuitry, such as an analog to digital (A/D) converter or amplifier, will excessively clip the received signal causing additional signal distortions. When the A/D converter is located at the front end of a digital demodulator, e.g., following an analog tuner, the clipping introduced by the A/D converter represents demodulator front end noise which can lead to demodulation errors.

Unfortunately, many known AGC designs fail to provide maximum use of signal processing circuitry's dynamic range and/or produce undesirable clipping in the presence of the types of noise discussed above. These problems with the known AGC circuits are due largely to the use of a fixed power reference level.

In view of the above discussion, it is apparent that there is a need for new and improved methods of performing automatic gain control. It is desirable that at least some new gain control methods support adjusting the power reference level used by a gain control circuit, e.g., in response to changing signal conditions. It is also desirable chat at least some new methods and apparatus capable of being implemented relatively easily using digital circuitry.

SUMMARY OF THE INVENTION

Figure 1:
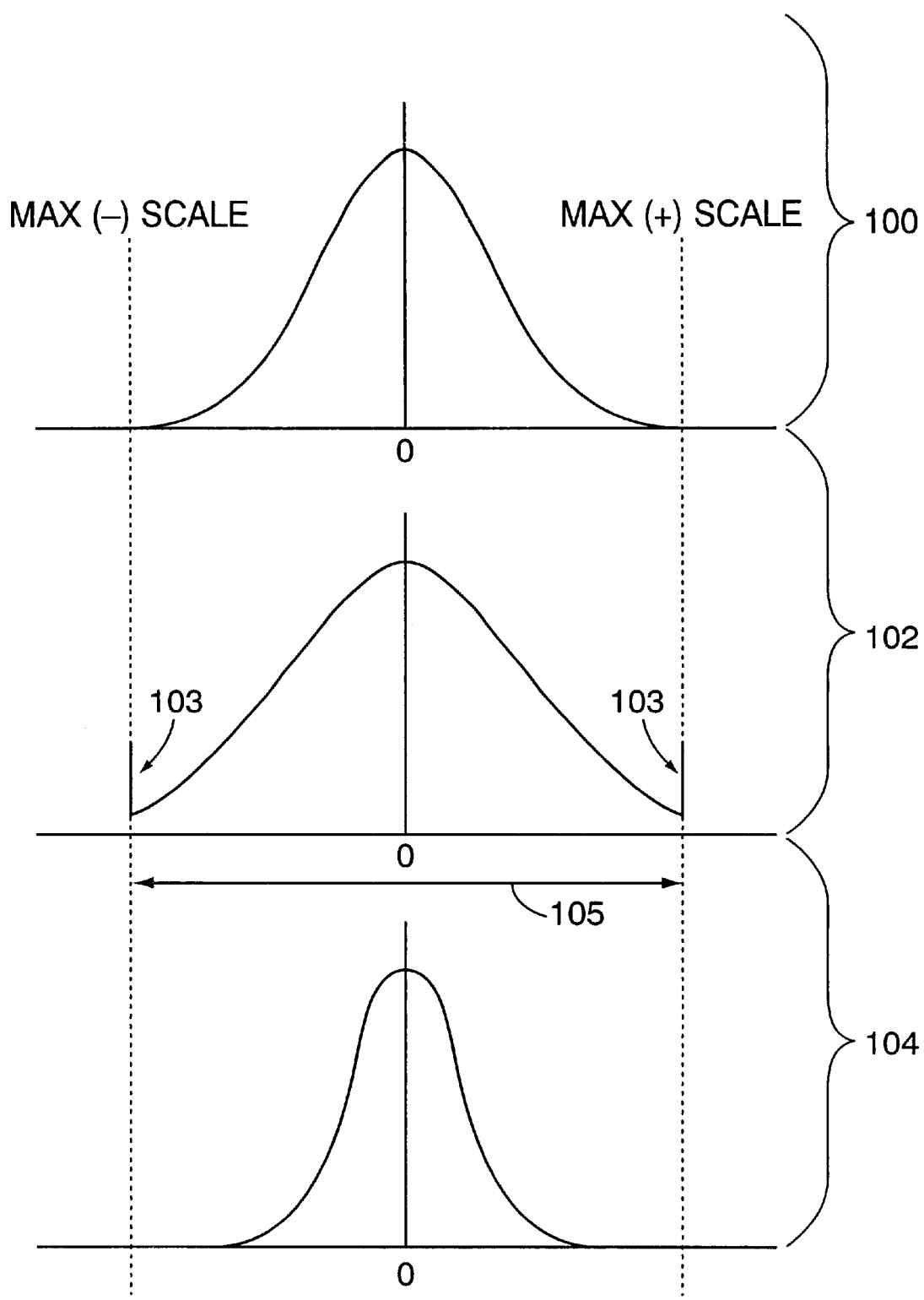
FIG. 1 is a histogram of a signal represented by a digital sampling system.

The present invention is directed to methods and apparatus for performing gain control in a manner that is designed to maximize the use of the dynamic range of signal processing circuitry, e.g., an A/D converter, while minimizing signal clipping.

One feature of the present invention is directed to reducing or eliminating signal clipping, as compared to known AGC systems which use a fixed power reference level. The present invention accomplishes this by adjusting the power reference level used for automatic gain control purposes in response to changing signal conditions. By adjusting a power reference level in accordance with the present invention, signal clipping is minimized and yet the full or almost the full dynamic range of signal processing circuitry, e.g., an analog to digital converter (ADC), is utilized.

In one embodiment, a state machine of the present invention has an analysis state which collects signal statistics, e.g., signal clipping and threshold statistics for a preslected period of time corresponding to a fixed number of samples. During the analysis state, the number of samples that equal or exceed either the minimum or maximum value (e.g., clip points), supported by the signal processing circuitry, are accumulated. In addition, statistics are also accumulated on the number of data samples that exceed a threshold corresponding to a point near the outer range of the signal processing circuitry's outer range. For processing of different types of signals, e.g., signals which have been modulated using different modulation schemes, the threshold may be altered thereby allowing the circuitry to support multiple modulation schemes. At the end of each analysis period, a decision is made to decrease the AGC power reference level if points were clipped, or increase the AGC power reference level if no points exceeded the variable threshold. If neither the condition to raise nor the condition to lower the AGC power reference level is satisfied, no change is made to the power reference level.

In another embodiment of the present invention, rather than adjust a power reference level, the state machine of the present invention directly controls the adjustment of the gain of a signal, i.e., it is used as an AGC circuit. In such an embodiment, when it is determined that the conditions to increase the power reference level are satisfied, a gain control signal is generated which causes the gain of the signal being processed to be increased. When it is determined that the condition to decrease the power reference level are satisfied, a gain control signal is generated which causes the gain of the signal being processed to be decreased. When it is determined that the conditions used to alter the power reference level are not satisfied, the control signal used to control the gain of the signal being processed is controlled so that no change is made to signal's gain.

Additional features and embodiments of the present invention will be apparent in view of the detailed description which follows.

DETAILED DESCRIPTION

Unfortunately, different channel conditions and different modulation types, call for different power reference levels to ensure optimum usage of signal processing circuitry such as an analog to digital converter. The gain control system of the present invention dynamically adjusts the utilized power reference level as a function of signal statistics, e.g., clipping and and/or thresholding statistics.

Figure 2:
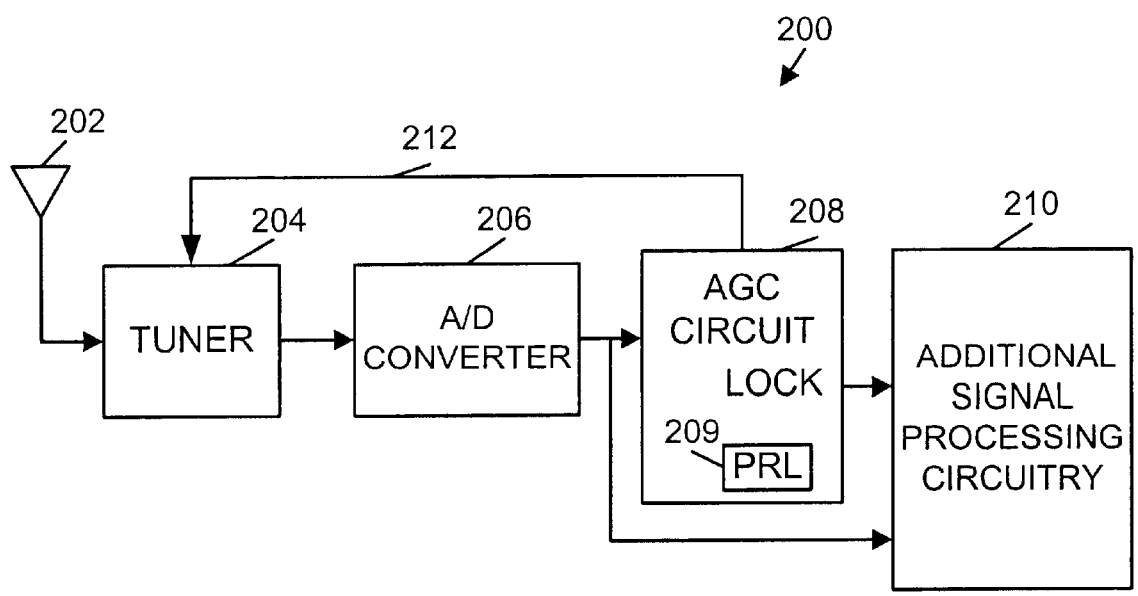
FIG. 2 illustrates a receiver which incorporates a known automatic gain control circuit.
Figure 3:
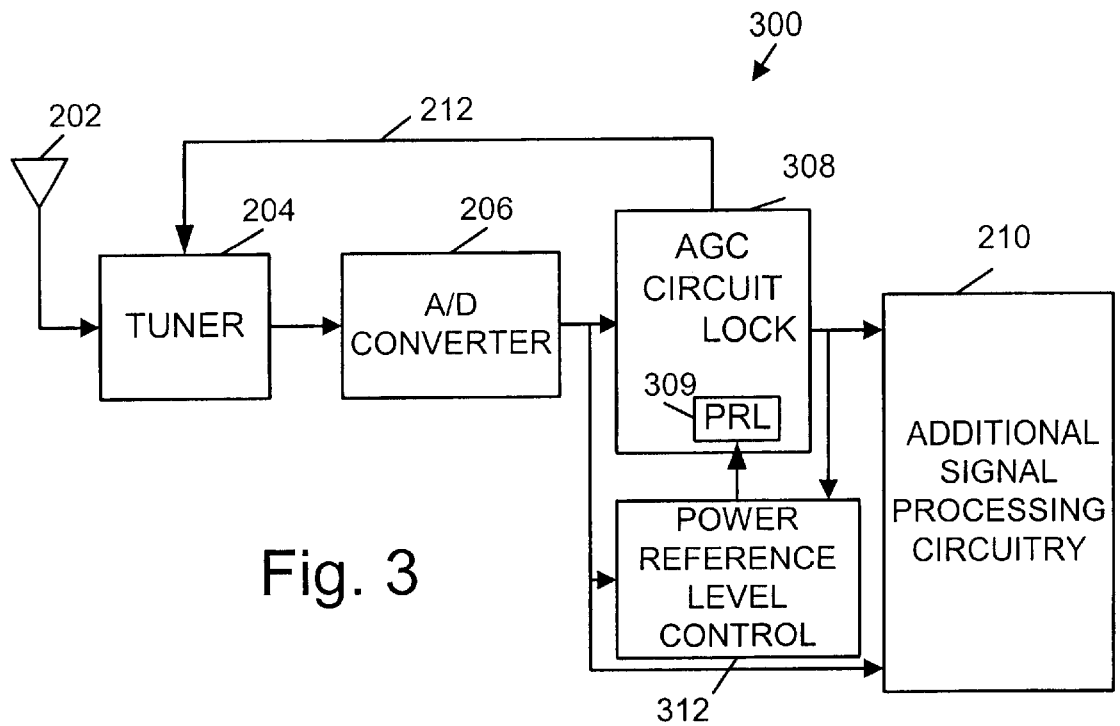
FIG. 3 illustrates a receiver implemented in accordance with the present invention.

FIG. 3 illustrates a receiver 300 implemented in accordance with the present invention. The receiver 300 includes many components which are the same as, or similar to, those of the known system 200. Such elements are identified in the figures using the same reference numerals as used in FIG. 2.

The receiver 300 of the present invention comprises an antenna 202, tuner 204, analog to digital (A/D) converter 206, AGC circuit 308, a power reference level control circuit 312 and additional signal processing circuitry, e.g., demodulator circuitry 210. The various components are coupled together as illustrated in FIG. 3.

In the receiver 300, the AGC circuit 308 includes a power reference level input for receiving a power reference level (PRL) signal. The PRL signal is used for updating the power reference level 309 used by the AGC circuit 308 to control the gain of the received signal. The AGC circuit 308 is similar in operation to the known AGC circuit 208 but, unlike the known AGC circuit 208, the circuit 308 of the present invention is designed to have its PRL 309 periodically updated.

An AGC LOCK signal output of the AGC circuit 308 is coupled to a corresponding input of the power reference level control circuit 312 and to a corresponding AGC lock signal input of the additional signal processing circuitry, e.g., demodulator circuitry 210.

In addition to receiving the AGC lock signal, the power reference level control circuit 312 of the present invention receives the digital signal being processed, e.g., the signal output by the A/D converter is 206. Accordingly, both the signal being processed and the AGC lock signal are available to the power reference level control circuit 312.

In accordance with the present invention the power reference level control circuit 312 maintains statistics on the signal being processed. For example, the power reference level control circuit 302, uses statistics on how many times the signal being processed was clipped in a given analysis period and also how many times a threshold, referred to herein as a tail threshold, is exceeded. Based on these statistics, a power reference level is periodically adjusted. In this manner, utilization of the useful dynamic range of the signal processing circuitry, e.g., A/D converter 206, can be maximized while signal clipping is avoided or minimized.

Figure 7:
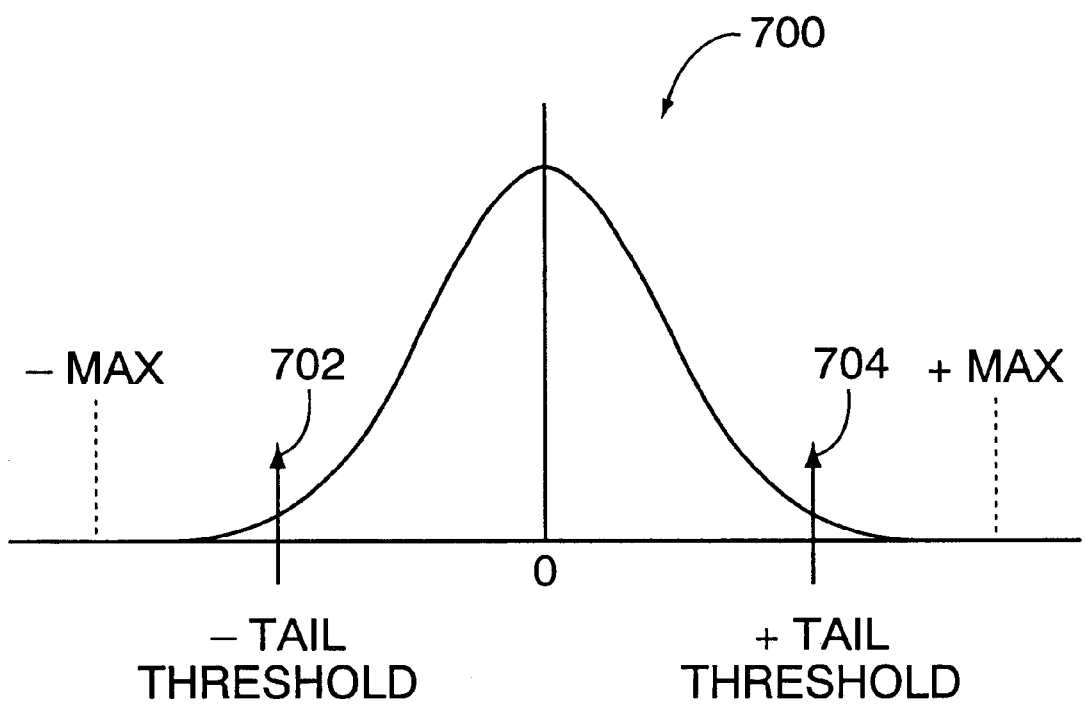
FIG. 7 is a signal diagram which illustrates various thresholds used in accordance with the present invention.

The tail thresholds will now be explained with regard to FIG. 7. FIG. 7 is a graph 700 of a perfectly quantized signal that uses the full dynamic range of an A/D converter and has avoided signal clipping. There are no sample values that equal either the min or max A/D values, but simultaneously there are numerous samples that have exceeded predetermined positive and negative tail thresholds 702, 704. These tail thresholds are used in accordance with the present invention to determine if the dynamic range of the signal processing circuitry, e.g., A/D converter 206, is being properly utilized. The tail thresholds 702, 704 may be, e.g., approximately 10% less than the max positive and max negative values, e.g., first and second maximum threshold values, which indicate the bounds of the available dynamic range. In the case of one exemplary embodiment 8 bits were used to represent signal values, with the MAX negative value being −128 and the MAX positive value being +127. In such an embodiment, for QAM and VSB signals, tail thresholds of +/−100 were found to provide good results. For other types of signals, slightly different tail thresholds may be desirable. Accordingly, different tail thresholds may, and in one embodiment are, stored and used, for different types of signals.

Figure 5:
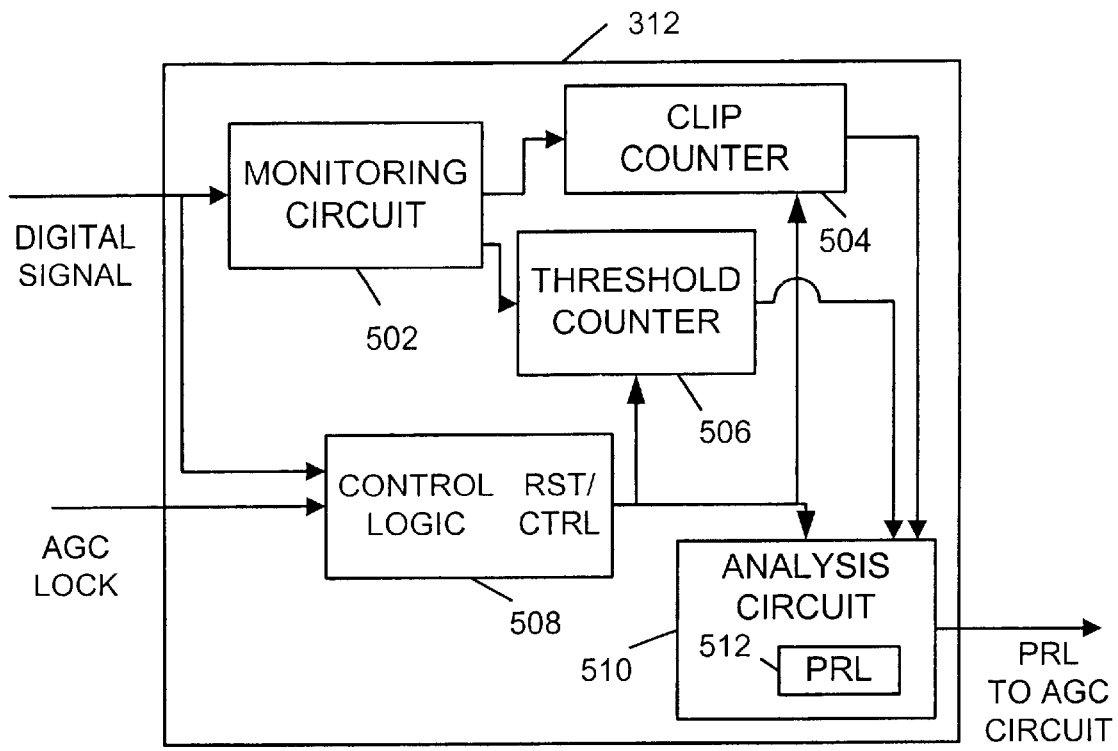
FIG. 5 illustrates a power reference control circuit implemented in accordance with the present invention.

FIG. 5 is a detailed illustration of a power reference level control circuit 312 implemented in accordance with the present invention. As illustrated, the circuit 312 includes a monitoring circuit 502, a clip counter 504, a threshold counter, a control logic 508 and an analysis circuit 510. The analysis circuitry includes memory 512 for storing the current PRL value, e.g., the value output to the AGC circuit.

The monitoring and control logic 502, 508 each receive the digital signal being processed, e.g., the digital signal output by A/D converter 206. The monitoring circuit 502 detects samples which equal or exceed the positive and negative maximum sample values and increments the clip counter 504 each time such a sample is detected. Thus, detection of samples outside the range bounded by the positive and negative maximum sample values causes the clip counter 504 to be incremented. The monitoring circuit 502 also detects samples which exceed the positive and negative tail thresholds. The threshold counter 506 is incremented each time the monitoring circuit 502 detects a sample which exceeds the positive tail threshold or the negative tail threshold. The output of the clip counter 504, the value CLIP_CNT, is supplied to the analysis circuit 510. Similarly, the output of the threshold counter 506, the value THRESHOLD_COUNT, is also supplied to the analysis circuit 510.

The control logic 508 is responsible for resetting the clip counter 504 and threshold counter 506 and for controlling when the analysis circuit updates the PRL value 512. The updated PRL value is output to the AGC circuit. The control logic receives as its inputs, the digital signal being processed and the AGC lock signal. From the signal being processed, the control logic 508 determines when a preselected number of samples, corresponding to a fixed analysis period, have been received. At the end of each analysis period, the analysis circuit is controlled to update the PRL 512 based on the CLIP_CNT and THRESHOLD_COUNT generated for the period.

In one embodiment, when the AGC lock signal is de-asserted, indicating that the sample values are unreliable for PRL adjustment purposes, the control logic 508 halts the incrementing of the counters 504, 506, the counting of samples contributing towards an analysis period, and the updating of the PRL value 512, until such time as the AGC lock signal is re-asserted. By temporarily halting PRL value adjustment in this manner, erroneous and invalid changes of the agc power reference level based on faulty sample values which would otherwise be processed when the AGC signal is not locked, are avoided.

Figure 8:
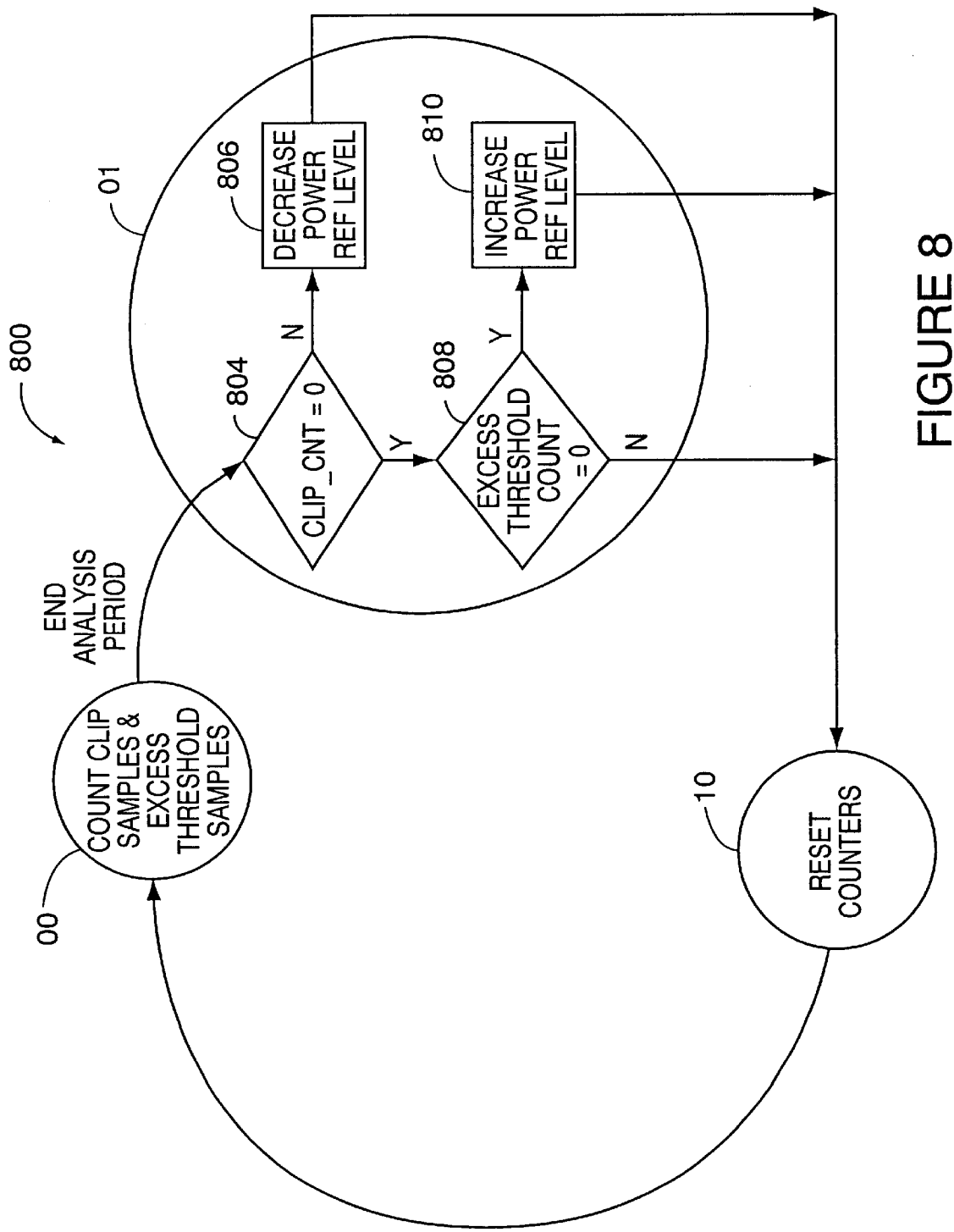
FIG. 8 is a state diagram showing states associated with adjusting a power reference level in accordance with the present invention.

The method, performed by the power reference level control circuit 312 of the present invention, of automatically adjusting the power reference level used by the AGC circuit 206, is illustrated in the state diagram shown in FIG. 8.

The state diagram includes three states, a monitoring/statistic collection state 00, a power reference adjustment state 01 and a reset state 10. During the monitoring/statistic state 00, the number of samples that equal the extreme minimum and maximum values of the A/D converter are accumulated, e.g., as the value CLIP_CNT, along with the number of points that exceed the tail threshold level, e.g., THRESHOLD_COUNT. Monitoring circuit 502 and counters 504, 506 are used to implement state 00.

The analysis period, which determines how many samples will be used in generating the counts produced in state 00, should be long enough that adjustments to the power reference level 309 will not be made at a rate faster than the AGC circuit 308 can react to them.

Once the monitoring/statistic collection state 00 is completed, e.g., because the analysis period has expired, operation proceeds to state 01, wherein a determination is made as to whether the power reference level (PRL) should be modified and any required modifications are made. Analysis circuit 610 is used to implement state 01. Circuit 610 may include comparators and other control logic for this purpose.

The first step 804 of state 01 involves determining if any clipping has occurred. This condition is indicated by CLIP_CNT being a non-zero value. If in step 804 it is determined that CLIP_COUNT does not equal zero, operation proceeds to step 806 wherein the power reference level stored in, and output by, the power reference level control 312, is decremented, e.g., by a fixed amount. With the change in the PRL 512, operation proceeds from state 01 to state 10.

If, however, in step 804 of state 01, it is determined that CLIP_CNT is equal to zero, indicating that no samples were clipped, operation proceeds to step 808 where a determination is made as to whether any sample values exceeded the positive or negative tail thresholds. If it is determined that THRESHOLD_COUNT is equal to zero, indicating that none of the samples exceeded with the positive or negative thresholds during the analysis period and that the dynamic range of the A/D converter 206 is being under utilized, operation proceeds to step 810 wherein the power reference level 512 stored in, and output by, the power reference level control 312, is decremented, e.g., by a fixed amount. With the change in the PRL, operation proceeds from state 01 to state 10.

In step 808 is it is determined that EXCESS_THRESHOLD_COUNT is NOT equal to zero, indicating that some of the samples exceeded with the positive or negative thresholds during the analysis period and that the dynamic range of the A/D converter 206 is being properly utilized, operation proceeds to state 10 with the power reference level being left unaltered.

In state 10, the counter used to maintain the values CLIP_CNT and EXCESS_THRESHOLD_COUNT are reset to zero. Control logic 508 may be used to implement the resetting of the counters. The process is then repeated, e.g., ad infinitum, by returning back to state 00. In this manner, the AGC power reference level is repeatedly adjusted to ensure that the signal level is such that the A/D converter 206 is used in an optimal manner. While the resetting of counters 504, 506 is shown as occurring after updating the PRL, it is to be understood that the counters may be reset once the counts corresponding to an analysis period are supplied to the circuit 610. Accordingly, the counters may be reset before the processing required to update the PRL value is completed.

Once the reference level is reached where neither of the test conditions of steps 804 and 808 are true, then the reference level remains at a constant value and can be considered to be in an equilibrium state.

Figure 9:
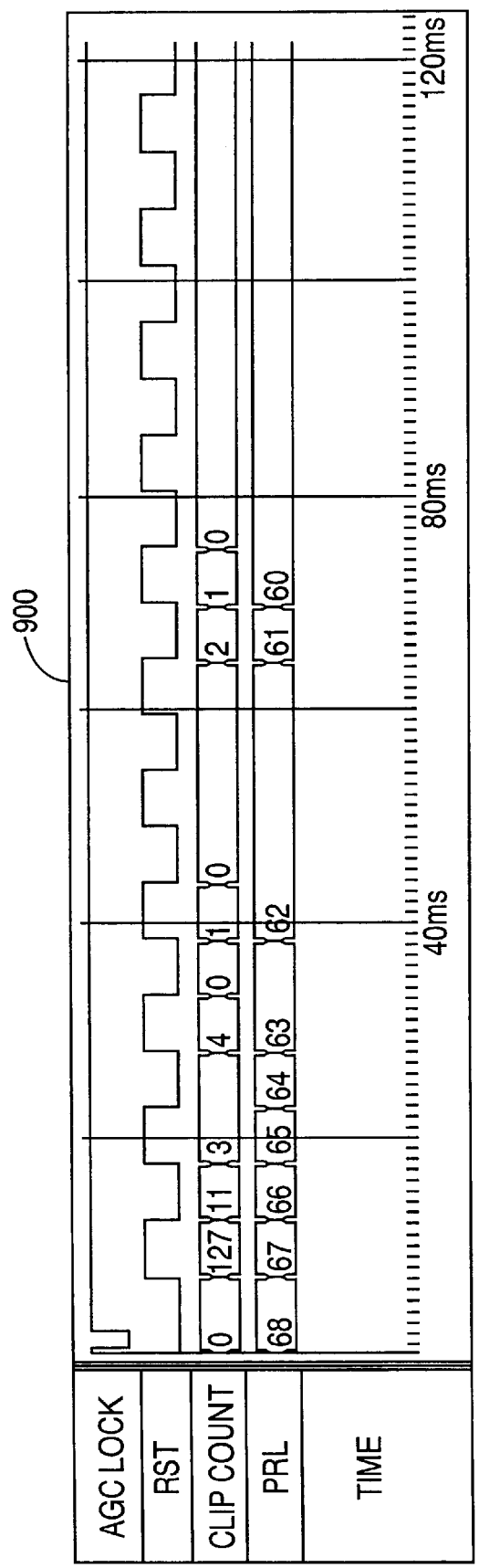
FIG. 9 is a signal diagram illustrating exemplary results obtained from using the power reference level control circuit of the present invention.

FIG. 9 is a signal diagram 900 illustrating exemplary results of using the power reference level control circuit 312 of the present invention to control the power reference level 309 used by an AGC circuit. The name of each of the signals shown is indicated in the first column immediately to the left of the identified signal. The first illustrated signal is the AGC signal. Note that it is initially de-asserted for a brief period of time but that once signal lock is achieved it remains asserted. Beneath the AGC lock signal, the reset signal RST is illustrated. Each transitioning edge of the RST signal marks the end of an analysis period and the point at which a new PRL may be output. Below the reset signal is illustrated the clip count (CLIP_CNT). At the end of each analysis period, the total clip count for the analysis period is determined. The total clip-count is provided in numeric form inside the clip count signal. Changes in the clip count correspond to transitions in the RST signal and are indicated in FIG. 9 by the crossing of the previously parallel lines. Beneath the clip-count signal, the PRL signal is illustrated. The value of the PRL signal is illustrated in numeric form with transitions being illustrated by the transition indicator. Note that PRL transition points correspond to transitions in the RST signal. The bottom of FIG. 9 illustrates time in milli-seconds. The excess threshold count is omitted in FIG. 9 since, in the particular illustrated example, the excess threshold count was exceeded during each of the illustrated analysis periods.

Note in the FIG. 9 illustration, the PRL is initially set too high, e.g., 68. Over time, in response to the occurrence of non-zero clip counts, the PRL value is adjusted downward, e.g., from 68 to 60. Once the PRL is set to 60, clip count becomes 0 and a steady state condition is achieved. Accordingly, upon being set to 60, PRL remains unchanged for the remaining portion of the time period illustrated in FIG. 9.

Various AGC circuits such as the known AGC circuit 208 and the AGC circuit 308 of the present invention generate AGC lock signals. The AGC lock signal is de-asserted when the majority of signal samples are vastly different from their nominal level, e.g., due to excessive noise. Accordingly, the AGC lock signal, when de-asserted, serves to indicate to other circuitry that the sample values being processed are unreliable.

As will now be discussed with regard to FIGS. 4 and 6, in accordance with one embodiment of the present invention the external AGC control voltage level, e.g., AGC signal, is controlled based directly on the counts and control logic used in other embodiments to adjust the PRL. In such an embodiment, when the CLIP_CNT does not equal zero, gain control signal is adjusted, e.g., decremented, to cause the gain of the signal being processed to be reduced. When no clipping is detected the AGC signal may be adjusted to increase signal gain. In one embodiment, the gain is increased when both the CLIP_CNT and THRESHOLD_COUNT=0. When the conditions to increase or decrease the signal gain are not satisfied, in such an embodiment, the AGC signal is left unaltered at the end of each analysis period.

Figure 4:
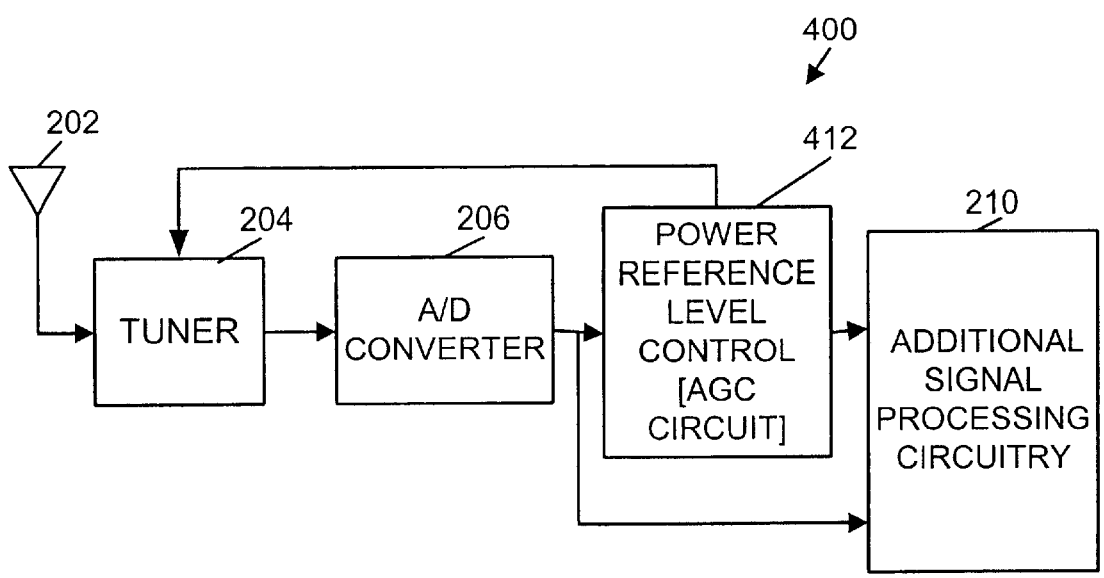
FIG. 4 illustrates a receiver implemented using a power reference control circuit of the present invention as an automatic gain control circuit.

FIG. 4 illustrates a receiver 400 implemented using a power reference level control circuit 412 as an automatic gain control circuit. In the FIG. 4 embodiment, the power reference level control circuit 412 is used to substitute for the known AGC circuit 208 of the known receiver 200. In such an embodiment, the power reference level control circuit 412 receives the signal being processed, e.g., the signal output by A/D converter 206, and generates there from an AGC signal and an AGC lock signal. The AGC signal is supplied to the AGC signal input of the tuner 204 while the AGC lock signal is supplied to the corresponding input of the additional signal processing circuit 210.

Figure 6:
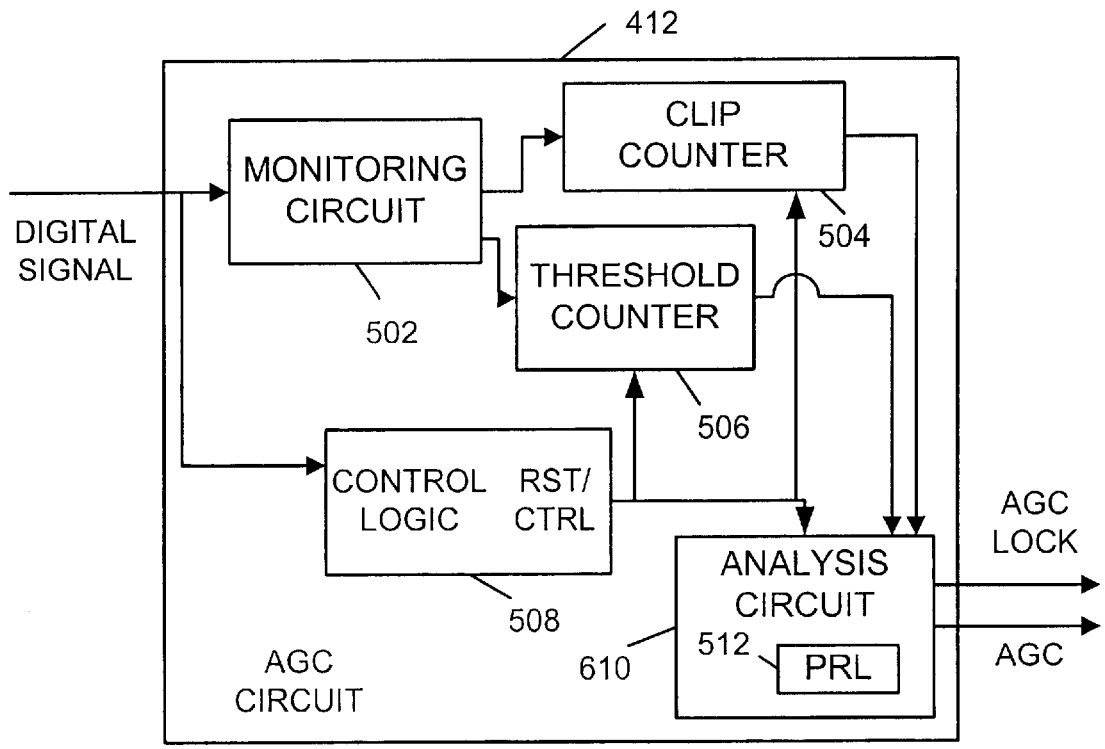
FIG. 6 illustrates an automatic gain control circuit implemented in accordance with the present invention.

A power reference level control circuit 412, suitable for use in the FIG. 4 embodiment, is illustrated in detail in FIG. 6. Design and operation of the power reference control circuit 412 of FIG. 6 is similar to that of the power reference level control circuit 312 of FIG. 5 with like numbered elements operating as previously described with regard to FIG. 5. Notably, in the FIG. 6 embodiment, the control logic 608 does not receive an AGC lock signal. Rather, in the FIG. 6 embodiment, the analysis circuit 610 periodically updates the PRL value regardless of the quality of the received samples. However, in order to generate an AGC lock signal, in addition to updating the PRL value in the above described manner with regard to FIG. 5, the analysis circuit 610 monitors for changes in the PRL value. The AGC lock signal is asserted when the PRL value remains unchanged for a preselected number of analysis periods, e.g., four or more consecutive analysis periods. When in an asserted state, the AGC lock signal is de-asserted, when a change in the PRL value for a preselected number of analysis periods, e.g., two consecutive analysis periods, is detected. In this manner, the analysis circuit generates the AGC lock signal based on consecutive changes to the PRL value 512.

The PRL value 512 which is periodically updated by the analsysis circuit 512 may be used directly as an AGC circuit. However, in implementations where the AGC signal is to be in another format, the analysis circuit converts the PRL value into an AGC signal having the format expected by, e.g., the tuner 204. Where the tuner 204 is designed to receive an analog signal, the analysis circuit 512 includes a D/A converter for converting the digital PRL value into an analog AGC signal. In most cases, the AGC value or signal level will be proportional to the PRL value generated by the analysis circuit 610. Accordingly, in the FIG. 6 embodiment, the power reference level control circuit 412 may be considered an AGC circuit with the PRL value being an AGC control value.

The methods and apparatus of the present invention can be used as part of e.g., a VSB demodulator, QAM demodulator, joint QAM/VSB demodulator or a wide variety of other demodulators and/or signal processing devices. In fact, the methods and apparatus of the present invention can be used in almost any application where signal gain control is required.

The invention has been described in the context of an exemplary embodiment where the dynamic range of an A/D converter serves to be the limiting factor with regard to the maximum gain to be allowed. In such a case, the maximum signal value serves to indicate signal distortion, e.g., clipping. In other embodiments, e.g., where the useful range of signal processing circuitry is not delimited by a fixed maximum value but marked instead by a point, e.g., a maximum threshold value, at which signal distortions or other undesirable conditions begin to occur. In such embodiments the clip counter 504 is incremented each time the max positive or negative threshold values are equaled or exceeded, e.g., by a more positive or more negative number, respectively. In such embodiments, the clip counter 504 might, more accurately, be described as a maximum threshold counter.

While the present invention has been described in the context of a plurality of separate circuits it is to be understood that the gain control methods of the present can, and in various embodiments are, implemented using software executed, e.g., on a general purpose computer with the computer's memory being used to store the power reference level and other information. In such an embodiment, the computer system's memory operates as a counter to store the various counts maintained in accordance with the invention while the computer's interface circuitry is used for receiving the signal or signal information and for outputting gain control information.

Numerous additional methods and apparatus encompassing the present invention will be apparent to those of ordinary skill in the art in view of the description included in the present application. Such additional methods and apparatus are contemplated as being within the scope of the present invention.

What is claimed is:

1. A gain control method, comprising the steps of:
monitoring a signal to detect samples equaling a first maximum threshold value;
incrementing a first value in a first counter each time a sample, equaling the first maximum threshold value, is detected;
updating a reference level, at periodic intervals, as a function of the first value;
using the reference level to perform a gain control operation;
monitoring the signal to detect samples exceeding a first tail threshold value; and
incrementing a second value in a second counter each time a sample exceeding the first tail threshold value is detected; and
wherein the step of updating the reference level is further performed as a function of the second value and includes decreasing the reference level if the first value exceeds a first fixed value.

2. The method of claim 1, further comprising the step of:
monitoring the signal to detect samples exceeding the first maximum threshold value; and
incrementing the first value in the first counter each time a sample, exceeding the first maximum threshold value, is detected.

3. The method of claim 1, wherein the step of updating the reference level includes the steps of:
increasing the reference level if the second value is less than a second fixed value and the first value does not exceed the first fixed value.

4. The method of claim 1,
wherein the reference level is a power reference level;
wherein the first fixed value is 0; and
wherein the second fixed value is 1.

5. The method of claim 3,
wherein the reference level is a power reference level; and
wherein the step of performing a gain control operation includes the steps of:
supplying the updated power reference level to an automatic gain control circuit; and
adjusting an automatic gain control signal as a function of the updated power reference level.

6. The method of claim 1, further comprising the step of:
receiving an automatic gain control lock signal; and
disabling incrementing of said first value when said automatic gain control lock signal indicates that an automatic gain control lock does not exist.

7. A gain control method, comprising the steps of:
monitoring a signal to detect samples equaling a first maximum threshold value;
incrementing a first value in a first counter each time a sample, equaling the first maximum threshold value, is detected;
updating a reference level, at periodic intervals, as a function of the first value;
using the reference level to perform a gain control operation;
receiving an automatic gain control lock signal; and
disabling updating of said reference level when said automatic gain control lock signal indicates that an automatic gain control lock does not exist.

8. The method of claim 1, further comprising the step of using different values for the first tail threshold when signals modulated using different modulation techniques are processed.

9. The method of claim 1,
wherein the step of performing a gain control operation includes the steps of:
generating an automatic gain control signal from the reference level; and
controlling gain applied to said signal as a function of the generated automatic gain control signal.

10. A gain control method, comprising the steps of:
monitoring a signal to detect samples equaling a first maximum threshold value;
incrementing a first value in a first counter each time a sample, equaling the first maximum threshold value, is detected;
updating a reference level, at periodic intervals, as a function of the first value;
using the reference level to perform a gain control operation;
monitoring the signal to detect samples exceeding a first tail threshold value;
incrementing a second value in a second counter each time a sample exceeding the first tail threshold value is detected;
wherein the step of updating the reference level is further performed as a function of the second value; and
wherein the step of performing a gain control operation includes the steps of:
(i) generating an automatic gain control signal from the reference level; and
(ii) controlling gain applied to said signal as a function of the generated automatic gain control signal; and
generating, as a function of the reference level, an automatic gain control lock signal that indicates an automatic gain control lock when said reference level remains unaltered for a consecutive number of said periodic intervals.

11. The method of claim 10, further comprising the step of:
setting said automatic gain control lock signal to indicate that an automatic gain control lock does not exist when said reference level is changed in each of multiple consecutive ones of said periodic intervals.

12. A gain control method, comprising the steps of:
monitoring a signal to detect samples equaling a first maximum threshold value;
incrementing a first value in a first counter each time a sample, equaling the first maximum threshold value, is detected;
updating a reference level, at periodic intervals, as a function of the first value;
using the reference level to perform a gain control operation;
monitoring a signal to detect samples which are equal to, or more negative than, a second maximum threshold value;
incrementing the first value each time a sample which is equal to or more negative than the second maximum threshold value is detected;
monitoring the signal to detect samples which are more negative than a second tail threshold value; and
incrementing the second value each time a sample, which is more negative than the second tail threshold value, is detected.

13. The method of claim 12,
wherein the first maximum threshold value corresponds to a positive value marking the end of a positive useful range supported by a signal processing circuit used to process said signal; and wherein the second maximum threshold value corresponds to a negative value marking the end of the negative useful range supported by the signal processing circuit used to process said signal.

14. The method of claim 13, wherein the first tail threshold is a value which is 85 to 95 percent of the first maximum threshold value.

15. A system for processing a signal, the system comprising:

an automatic gain control circuit for generating an automatic gain control signal as a function of a power reference level; and a power reference level control circuit coupled to the automatic gain control circuit for periodically generating from said signal an updated power reference level.

16. The system of claim 15, wherein the power reference level control circuit includes:

a monitoring circuit for detecting when a sample in said signal equals or exceeds a maximum threshold and when a sample in said signal exceeds a tail threshold which is smaller than the maximum threshold.

17. The system of claim 16, wherein the power reference level control circuit further includes:

first counting means for generating a first count of the number of times the monitoring circuit detects a sample in said signal which equals or exceeds the maximum threshold; and second counting means for generating a second count of the number of times the monitoring circuit detects a sample in said signal which exceeds the tail threshold; and means for periodically updating the power reference level as a function of said first and second counts.

18. The system of claim 17, wherein the power reference level control circuit further includes:

control logic which resets the first and second counts at the end of an analysis period corresponding to the processing of a fixed number of signal samples.

19. The system of claim 18, wherein the control logic includes an automatic gain control lock signal input; and wherein the control logic disables updating of the power reference level when the automatic gain control lock signal indicates that a gain control signal lock does not exist.

20. The system of claim 19, further comprising:

a tuner for receiving at least one of a vestigial sideband signal and a quadrature amplitude modulated signal, the tuner including an amplifier responsive to said gain control signal.

21. An automatic gain control circuit for controlling a gain applied to a signal, comprising:

a monitoring circuit for detecting when a sample in said signal equals a maximum threshold and when a sample in said signal exceeds a tail threshold which is smaller than the maximum threshold, first counting means for generating a first count as a function of the number of times the monitoring circuit detects a sample in said signal which equals the maximum threshold, wherein the maximum threshold corresponds to a positive value marking the end of a positive useful signal processing range supported by a signal processing circuit used to process said signal;

second counting means for generating a second count as a function of the number of times the monitoring circuit detects a sample in said signal which exceeds the tail threshold;

means for periodically updating an automatic gain control signal as a function of said first and second counts; and a control circuit for resetting the first and second counts at the end of an analysis period.

22. The circuit of claim 21, wherein the tail threshold is a value which is 75 to 95 percent of the first maximum threshold value.

23. The circuit of claim 21, wherein an analysis period corresponds to the processing of a fixed number of samples in the signal.

24. An automatic gain control circuit for controlling a gain applied to a signal, comprising:

a monitoring circuit for detecting when a sample in said signal equals a maximum threshold and when a sample in said signal exceeds a tail threshold which is smaller than the maximum threshold;

first counting means for generating a first count as a function of the number of times the monitoring circuit detects a sample in said signal which equals the maximum threshold, wherein the maximum threshold corresponds to a positive value marking the end of a positive useful signal processing range supported by a signal processing circuit used to process said signal;

second counting means for generating a second count as a function of the number of times the monitoring circuit detects a sample in said signal which exceeds the tail threshold;

means for periodically updating an automatic gain control signal as a function of said first and second counts; and a gain control lock signal output for supplying a gain control lock signal, generated by said circuit, to additional processing circuitry.

25. A method of processing a signal, comprising the steps of:

monitoring the signal to detect samples equaling a first maximum threshold value;

incrementing a first value each time a sample equaling the first maximum threshold value, is detected;

updating a reference level, at periodic intervals, as a function of the first value;

generating a gain control signal as a function of the updated reference level;

receiving a gain control lock signal; and disabling the updating of the reference level when the received gain control lock signal indicates that the gain control signal is not locked.

26. The method of claim 25, further comprising the step of:

monitoring the signal to detect samples exceeding a first tail threshold value; and incrementing a second value each time a sample exceeding the first tail threshold value is detected;

resetting the first and second counters at the end of each periodic interval; and wherein the gain control signal is also generated as a function of the second value; and wherein the reference level is a value indicating the level of the gain control signal immediately prior to the updating of the reference level.

* * * * *